(12) United States Patent
Sinha

(10) Patent No.: US 11,948,320 B2
(45) Date of Patent: Apr. 2, 2024

(54) SYSTEMS AND METHODS FOR DEPTH ESTIMATION BY LEARNING TRIANGULATION AND DENSIFICATION OF SPARSE POINTS FOR MULTI-VIEW STEREO

(71) Applicant: MAGIC LEAP, INC., Plantation, FL (US)

(72) Inventor: Ayan Tuhinendu Sinha, San Francisco, CA (US)

(73) Assignee: Magic Leap, Inc., Plantation, FL (US)

(*) Notice: Subject to any disclaimer, the term of this patent is extended or adjusted under 35 U.S.C. 154(b) by 94 days.

(21) Appl. No.: 17/194,117

(22) Filed: Mar. 5, 2021

(65) Prior Publication Data

US 2021/0279904 A1 Sep. 9, 2021

Related U.S. Application Data

(60) Provisional application No. 62/985,773, filed on Mar. 5, 2020.

(51) Int. Cl.
| | |
|---|---|
| *G06T 7/593* | (2017.01) |
| *G06T 7/73* | (2017.01) |
| *G06T 9/00* | (2006.01) |
| *H04N 13/15* | (2018.01) |
| *H04N 13/161* | (2018.01) |
| *H04N 13/282* | (2018.01) |

(52) U.S. Cl.
CPC ............... *G06T 7/596* (2017.01); *G06T 7/73* (2017.01); *G06T 9/002* (2013.01); *H04N 13/15* (2018.05); *H04N 13/161* (2018.05); *H04N 13/282* (2018.05); *G06T 2207/10012* (2013.01); *G06T 2207/10028* (2013.01); *G06T 2207/20081* (2013.01); *G06T 2207/20084* (2013.01)

(58) Field of Classification Search
CPC  G06T 7/596; G06T 7/73; G06T 9/002; G06T 2207/10012; G06T 2207/10028; G06T 2207/20081; G06T 2207/20084; G06T 7/55; G06T 7/50; G06T 7/593; H04N 13/15; H04N 13/161; H04N 13/282
See application file for complete search history.

(56) References Cited

U.S. PATENT DOCUMENTS

| | | | |
|---|---|---|---|
| 9,619,748 B1 | 4/2017 | Commons et al. | |
| 10,304,193 B1* | 5/2019 | Wang | G06N 3/0454 |
| 10,682,108 B1* | 6/2020 | Ma | A61B 1/000096 |
| 2012/0163672 A1 | 6/2012 | McKinnon | |

(Continued)

OTHER PUBLICATIONS

PCT International Search Report and Written Opinion for International Appln. No. PCT/US21/21239, Applicant Magic Leap, Inc., dated May 26, 2021 (16 pages).

(Continued)

*Primary Examiner* — Xiaolan Xu
(74) *Attorney, Agent, or Firm* — Vista IP Law Group, LLP

(57) ABSTRACT

Systems and methods for estimating depths of features in a scene or environment surrounding a user of a spatial computing system, such as a virtual reality, augmented reality or mixed reality (collectively, cross reality) system, in an end-to-end process. The estimated depths can be utilized by a spatial computing system, for example, to provide an accurate and effective 3D cross reality experience.

16 Claims, 10 Drawing Sheets
(4 of 10 Drawing Sheet(s) Filed in Color)

(56) References Cited

U.S. PATENT DOCUMENTS

| | | | |
|---|---|---|---|
| 2014/0049612 A1 | 2/2014 | Ishii | |
| 2014/0192154 A1 | 7/2014 | Jeong et al. | |
| 2015/0199825 A1* | 7/2015 | Capens | G06T 1/60 345/582 |
| 2015/0237329 A1 | 8/2015 | Venkataraman et al. | |
| 2015/0262412 A1* | 9/2015 | Gruber | G06T 15/50 345/426 |
| 2015/0269723 A1* | 9/2015 | Karam | G06V 20/64 348/46 |
| 2016/0148079 A1 | 5/2016 | Shen et al. | |
| 2018/0176545 A1 | 6/2018 | Aflaki Beni | |
| 2018/0365532 A1 | 12/2018 | Molchanov et al. | |
| 2019/0051056 A1* | 2/2019 | Chiu | G06F 16/903 |
| 2019/0108683 A1 | 4/2019 | Valli et al. | |
| 2019/0130275 A1 | 5/2019 | Chen et al. | |
| 2019/0278983 A1* | 9/2019 | Iqbal | G06N 3/0454 |
| 2021/0142497 A1* | 5/2021 | Pugh | G06T 7/55 |
| 2021/0150747 A1* | 5/2021 | Liu | G06T 7/593 |
| 2021/0237774 A1* | 8/2021 | Tang | G06T 7/579 |

OTHER PUBLICATIONS

Extended European Search Report for EP Patent Appln. No. 21764896.3 dated Jun. 30, 2023.

Wende (On Improving the Performance of Multi-threaded CUDA Applications with Concurrent Kemel Execution by Kernel Reordering, 2012 Symposium on Application Accelerators in High Performance Computing) (Year: 2012).

PCT International Search Report and Written Opinion for International Appln. No. PCT/US20/33885 (Attorney Docket No. ML-0875WO), Applicant Magic Leap, Inc., dated Aug. 31, 2020 (10 pages).

Chen et al. "Fully Convolutional Neural Network with Augmented Atrous Spatial Pyramid Pool and Fully Connected Fusion Path for High Resolution Remote Sensing Image Segmentation." In: Appl. Sci .; May 1, 2019, [online] [retrieved on Jul. 30, 2020 (Jul. 30, 2020)] Retrieved from the Internet <URL: https://www.mdpi.com/2076-3417/9/9/1816>, entire document.

Final Office Action for U.S. Appl. No. 16/879,736 dated Apr. 29, 2022.

Amendment After Final for U.S. Appl. No. 16/879,736 dated Jul. 29, 2022.

Extended European Search Report for EP Patent Appln. No. 20809006.8 dated Aug. 11, 2022.

Non-Final Office Action for U.S. Appl. No. 16/879,736 dated Sep. 15, 2022.

Final Office Action for U.S. Appl. No. 16/879,736 dated Jan. 12, 2023.

Foreign Response for EP Patent Appln. No. 20809006.8 dated Mar. 9, 2023.

Notice of Allowance for U.S. Appl. No. 16/879,736 dated Mar. 31, 2023.

Notice of Allowance for U.S. Appl. No. 16/879,736 dated May 30, 2023.

Foreign NOA for JP Patent Appln. No. 2021-568891 dated Oct. 13, 2023.

Rajeev Ranjan et al.: "HyperFace: A Deep Multi-Task Learning Framework for Face Detection, Landmark Localization, Pose Estimation, and Gender Recognition", May 11, 2016 (May 11, 2016), XP055552344, DOI: 10.1109/TPAMI.2017.2781233 Retrieved from the Internet: URL:https://arxiv.org/pdf/1603.01249v2 [retrieved on Feb. 6, 2019] * 3, 4 and 5; figures 2, 6 *.

Fisher Yu et al.: "Deep Layer Aggregation" arxiv.org, Cornell University Library, 201 Olin Library Cornell University Ithaca, NY 14853, Jul. 20, 2017 (Jul. 20, 2017), XP081001885, * Section 3 and 4; figures 2,3,4 *.

* cited by examiner

| | MLE | MScore | Num | Rep | rot@5 | trans@5 |
|---|---|---|---|---|---|---|
| ORB | 2.584 | 0.194 | 401 | 0.613 | 0.142 | 0.064 |
| SIFT | 2.327 | 0.201 | 203 | 0.496 | 0.311 | 0.148 |
| SURF | 2.577 | 0.198 | 268 | 0.460 | 0.303 | 0.134 |
| SP | 2.545 | 0.375 | 129 | 0.519 | 0.489 | 0.244 |
| Ours | 3.101 | 0.329 | 1511 | 0.738 | 0.518 | 0.254 |

Table 1. Performance of Different Descriptors on ScanNet

*FIG. 8*

| | Abs-Rel | Abs | Sq-Rel | $\delta$ | $\delta^2$ | $\delta^3$ |
|---|---|---|---|---|---|---|
| GPMvsNet | 0.1306 | 0.2600 | 0.0944 | 0.8841 | 0.9462 | 0.9753 |
| GPMvsNet-FT | 0.1079 | 0.2255 | 0.0960 | 0.8905 | 0.9591 | 0.9789 |
| MVDepthNet | 0.1191 | 0.2096 | 0.0910 | 0.8890 | 0.9599 | 0.9851 |
| MVDepthNet-FT | 0.1054 | 0.1911 | 0.0970 | 0.8952 | 0.9707 | 0.9895 |
| DPSNet | 0.1470 | 0.2248 | 0.1035 | 0.8486 | 0.9474 | 0.9761 |
| DPSNet-FT | 0.1025 | 0.1675 | 0.0574 | 0.9102 | 0.9708 | 0.9872 |
| Ours | 0.0932 | 0.1540 | 0.0506 | 0.9287 | 0.9767 | 0.9893 |

Table 2. Performance of Depth Estimation on ScanNet (we use sequences of length 3 and sample every 20 frames).

*FIG. 9*

| | 2 Frames | | | 4 Frames | | | 5 Frames | | | 7 Frames | | |
|---|---|---|---|---|---|---|---|---|---|---|---|---|
| | AbR | Abs | SqR | AbR | Abs | SqR | AbR | Abs | SqR | AbR | Abs | SqR |
| GPN | 0.112 | 0.233 | 0.101 | 0.109 | 0.226 | 0.100 | 0.107 | 0.226 | 0.112 | 0.109 | 0.230 | 0.116 |
| MVN | 0.126 | 0.238 | 0.471 | 0.105 | 0.191 | 0.078 | 0.106 | 0.192 | 0.071 | 0.108 | 0.195 | 0.067 |
| DPS | 0.099 | 0.181 | 0.062 | 0.102 | 0.168 | 0.057 | 0.102 | 0.168 | 0.057 | 0.102 | 0.167 | 0.057 |
| Ours | 0.106 | 0.173 | 0.057 | 0.090 | 0.150 | 0.049 | 0.088 | 0.147 | 0.048 | 0.087 | 0.144 | 0.043 |

Table 3. Performance of Depth Estimation on ScanNet (we use sequences of different length).

FIG. 10

| | Abs-Rel | Abs | Sq-Rel | $\delta$ | $\delta^2$ | $\delta^3$ |
|---|---|---|---|---|---|---|
| MVDepthNet | 0.1377 | 0.3199 | 0.1564 | 0.8245 | 0.9601 | 0.9851 |
| MVDepthNet-FT | 0.3092 | 0.7209 | 4.4899 | 0.7873 | 0.9117 | 0.9387 |
| DPSNet | 0.1590 | 0.3341 | 0.1564 | 0.8087 | 0.9363 | 0.9787 |
| DPSNet-FT | 0.1274 | 0.2858 | 0.0855 | 0.8396 | 0.9459 | 0.9866 |
| Ours | 0.1245 | 0.2662 | 0.0741 | 0.8551 | 0.9728 | 0.9902 |

Table 4. Performance of Depth Estimation on Sun3D (we use sequences of length 2).

FIG. 11

$$C_{j,k} = \hat{D}_j * D_j^k, \forall x \in \mathcal{E}, \quad (1)$$

where $\hat{D}$ is the descriptor field of the anchor image, $D^k$ is the descriptor field of the $k^{th}$ reference image, and convolved over all sampled points $x$ along the clamped epipolar line $E$ for point $j$. This effectively provides a cross-correlation map (See [Ref. 2]) between the descriptor field and interest point descriptors. High values in this map indicate potential key-point matches in the reference images to the interest points in the anchor image. In practice, we add batch normalization (See [Ref. 20]) and ReLU non-linearity (See [Ref. 23]) to output $C_{j,k}$ in order to ease training.

FIG. 12

$$C'_{j,k} = \exp(C_{j,k}) / (\sum_{r_x=1}^{W} \sum_{r_y=1}^{H} \exp(C_{j,k}(r_x, r_y))), \quad (2)$$

where, $C_{j,k}$ indicates the cross-correlation map for the $j^{th}$ inter-point and $k^{th}$ view, and $W, H$ are spatial dimensions of the epipolar search line.

FIG. 13

$$x_{j,k} = \sum_{r_x=1}^{W} \sum_{r_y=1}^{H} r(x,y)(C'_{j,k}(r(x,y))) \quad (3)$$

FIG. 14

$$A_j \bar{z}_j = 0, \quad (4)$$

where $A_j \in R^{2k,4}$ is a matrix composed of the components from the full projection matrices and $x_{j,k}$.

FIG. 15

$$(w_j A_j) \bar{z}_j = 0, \quad (5)$$

where, $W_k$ are weights to the coefficients of the matrix corresponding to different views. The weights $w$ are set to be the max value in each cross-correlation map.

FIG. 16

SYSTEMS AND METHODS FOR DEPTH ESTIMATION BY LEARNING TRIANGULATION AND DENSIFICATION OF SPARSE POINTS FOR MULTI-VIEW STEREO

CROSS REFERENCE TO RELATED APPLICATIONS

The present application claims benefit under 35 U.S.C. § 119 to U.S. Provisional Patent Application Ser. No. 62/985,773 filed on Mar. 5, 2020, entitled "SYSTEMS AND METHODS FOR DEPTH ESTIMATION BY LEARNING TRIANGULATION AND DENSIFICATION OF SPARSE POINTS FOR MULTI-VIEW STEREO," which is hereby incorporated by reference into the present application in its entirety.

FIELD OF THE INVENTION

The present invention is related to computing, learning network configurations, and connected mobile computing systems, methods, and configurations, and more specifically to systems and methods for estimating depths of features in a scene from multi-view images, which estimated depths may be used in mobile computing systems, methods, and configurations featuring at least one wearable component configured for virtual and/or augmented reality operation.

BACKGROUND

Modern computing and display technologies have facilitated the development of systems for so called "virtual reality" ("VR"), "augmented reality" ("AR"), and/or "mixed reality" ("MR") environments or experiences, referred to collectively as "cross-reality" ("XR") environments or experiences. This can be done by presenting computer-generated imagery to a user through a head-mounted display. This imagery creates a sensory experience which immerses the user in a simulated environment. This data may describe, for example, virtual objects that may be rendered in a way that users' sense or perceive as a part of a physical world and can interact with the virtual objects. The user may experience these virtual objects as a result of the data being rendered and presented through a user interface device, such as, for example, a head-mounted display device. The data may be displayed to the user to see, or may control audio that is played for the user to hear, or may control a tactile (or haptic) interface, enabling the user to experience touch sensations that the user senses or perceives as feeling the virtual object.

XR systems may be useful for many applications, spanning the fields of scientific visualization, medical training, engineering design and prototyping, tele-manipulation and tele-presence, and personal entertainment. VR systems typically involve presentation of digital or virtual image information without transparency to actual real-world visual input.

AR systems generally supplement a real-world environment with simulated elements. For example, AR systems may provide a user with a view of a surrounding real-world environment via a head-mounted display. Computer-generated imagery can also be presented on the head-mounted display to enhance the surrounding real-world environment. This computer-generated imagery can include elements which are contextually-related to the surrounding real-world environment. Such elements can include simulated text, images, objects, and the like. MR systems also introduce simulated objects into a real-world environment, but these objects typically feature a greater degree of interactivity than in AR systems.

AR/MR scenarios often include presentation of virtual image elements in relationship to real-world objects. For example, an AR/MR scene is depicted wherein a user of an AR/MR technology sees a real-world scene featuring the environment surrounding the user, including structures, objects, etc. In addition to these features, the user of the AR/MR technology perceives that they "see" computer generated features (i.e., virtual object), even though such features do not exist in the real-world environment. Accordingly, AR and MR, in contrast to VR, include one or more virtual objects in relation to real objects of the physical world. The virtual objects also interact with the real world objects, such that the AR/MR system may also be termed a "spatial computing" system in relation to the system's interaction with the 3D world surrounding the user. The experience of virtual objects interacting with real objects greatly enhances the user's enjoyment in using the XR system, and also opens the door for a variety of applications that present realistic and readily understandable information about how the physical world might be altered.

The visualization center of the brain gains valuable perception information from the motion of both eyes and components thereof relative to each other. Vergence movements (i.e., rolling movements of the pupils toward or away from each other to converge the lines of sight of the eyes to fixate upon an object) of the two eyes relative to each other are closely associated with accommodation (or focusing) of the lenses of the eyes. Under normal conditions, accommodating the eyes, or changing the focus of the lenses of the eyes, to focus upon an object at a different distance will automatically cause a matching change in vergence to the same distance, under a relationship known as the "accommodation-vergence reflex." Likewise, a change in vergence will trigger a matching change in accommodation, under normal conditions. Working against this reflex, as do most conventional stereoscopic VR/AR/MR configurations, is known to produce eye fatigue, headaches, or other forms of discomfort in users.

Stereoscopic wearable glasses generally feature two displays—one for the left eye and one for the right eye—that are configured to display images with slightly different element presentation such that a three-dimensional perspective is perceived by the human visual system. Such configurations have been found to be uncomfortable for many users due to a mismatch between vergence and accommodation ("vergence-accommodation conflict") which must be overcome to perceive the images in three dimensions. Indeed, some users are not able to tolerate stereoscopic configurations. These limitations apply to VR, AR, and MR systems. Accordingly, most conventional VR/AR/MR systems are not optimally suited for presenting a rich, binocular, three-dimensional experience in a manner that will be comfortable and maximally useful to the user, in part because prior systems fail to address some of the fundamental aspects of the human perception system, including the vergence-accommodation conflict.

Various systems and methods have been disclosed for addressing the vergence-accommodation conflict. For example, U.S. Utility patent application Ser. No. 14/555,585 discloses VR/AR/MR systems and methods that address the vergence-accommodation conflict by projecting light at the eyes of a user using one or more light-guiding optical elements such that the light and images rendered by the light appear to originate from multiple depth planes. All patent applications, patents, publications, and other references referred to herein are hereby incorporation by reference in their entireties, and for all purposes. The light-guiding optical elements are designed to in-couple virtual light corresponding to digital or virtual objects, propagate it by total internal reflection ("TIR"), and then out-couple the virtual light to display the virtual objects to the user's eyes. In AR/MR systems, the light-guiding optical elements are also designed to be transparent to light from (e.g., reflecting off of) actual real-world objects. Therefore, portions of the light-guiding optical elements are designed to reflect virtual light for propagation via TIR while being transparent to real-world light from real-world objects in AR/MR systems.

AR/MR scenarios often include interactions between virtual objects and a real-world physical environment. Similarly, some VR scenarios include interactions between completely virtual objects and other virtual objects. Delineating objects in the physical environment facilitates interactions with virtual objects by defining the metes and bounds of those interactions (e.g., by defining the extent of a particular structure or object in the physical environment). For instance, if an AR/MR scenario includes a virtual object (e.g., a tentacle or a fist) extending from a particular object in the physical environment, defining the extent of the object in three dimensions allows the AR/MR system to present a more realistic AR/MR scenario. Conversely, if the extent of objects is not defined or inaccurately defined, artifacts and errors will occur in the displayed images. For instance, a virtual object may appear to extend partially or entirely from midair adjacent an object instead of from the surface of the object. As another example, if an AR/MR scenario includes a virtual character walking on a particular horizontal surface in a physical environment, inaccurately defining the extent of the surface may result in the virtual character appearing to walk off of the surface without falling, and instead floating in midair.

Accordingly, depth sensing of scenes, such as a surrounding environment, are useful for in a wide range of applications, ranging from cross reality systems to autonomous driving. Estimating depth of scenes can be broadly divided into classes: active and passive sensing. Active sensing techniques include LiDAR, structured-light and time-of-flight (ToF) cameras, whereas depth estimation using a monocular camera or stereopsis of an array of cameras is termed passive sensing. Active sensors are currently the de-facto standard of applications requiring depth sensing due to good accuracy and low latency in varied environments. (see [Ref. 44]). Numbered references in brackets ("[Ref. ##]") refer to the reference list appended below; each of these references is incorporated by reference in its entirety herein.

However, active sensors have their own of limitation. LiDARs are prohibitively expensive and provide sparse measurements. Structured-light and ToF depth cameras have limited range and completeness due to the physics of light transport. Furthermore, they are power hungry and inhibit mobility critical for AR/VR applications on wearables. Consequently, computer vision researchers have pursued passive sensing techniques as a ubiquitous, cost-effective and energy-efficient alternative to active sensors. (See [Ref. 30]).

Passive depth sensing using stereo cameras requires a large baseline and careful calibration for accurate depth estimation. (See [Ref. 3]). A large baseline is infeasible for mobile devices like phones and wearables. An alternative is to use multi-view stereo (MVS) techniques for a moving monocular camera to estimate depth. MVS generally refers to the problem of reconstructing 3D scene structure from multiple images with known camera poses and intrinsics. (See [Ref 14]). The unconstrained nature of camera motion alleviates the baseline limitation of stereo-rigs, and the algorithm benefits from multiple observations of the same scene from continuously varying viewpoints. (See [Ref. 17]). However, camera motion also makes depth estimation more challenging relative to rigid stereo-rigs due to pose uncertainty and added complexity of motion artifacts. Most MVS approaches involve building a 3D cost volume, usually with a plane sweep stereo approach. (See [Refs. 41,18]). Accurate depth estimation using MVS relies on 3D convolutions on the cost volume, which is both memory as well as computationally expensive, scaling cubically with the resolution. Furthermore, redundant compute is added by ignoring useful image-level properties such as interest points and their descriptors, which are a necessary precursor to camera pose estimation, and hence, any MVS technique. This increases the overall cost and energy requirements for passive sensing.

Passive sensing using a single image is fundamentally unreliable due to scale ambiguity in 2D images. Deep learning based monocular depth estimation approaches formulate the problem as depth regression (see [Refs. 10,11]) and have reduced the performance gap to those of active sensors (see [Refs. 26,24]), but still far from being practical. Recently, sparse-to-dense depth estimation approaches have been proposed to remove the scale ambiguity and improve robustness of monocular depth estimation. (See [Ref. 30]. Indeed, recent sparse-to-dense approaches with less than 0.5% depth samples have accuracy comparable to active sensors, with higher range and completeness. (See [Ref 6]. However, these approaches assume accurate or seed depth samples from an active sensor which is limiting. The alternative is to use the sparse 3D landmarks output from the best performing algorithms for Simultaneous Localization and Mapping (SLAM) (see [Ref 31]) or Visual Inertial Odometry (VIO) (see [Ref. 33]). However, using depth evaluated from these sparse landmarks in lieu of depth from active sensors, significantly degrades performance. (See [Ref 43]). This is not surprising as the learnt sparse-to-dense network ignores potentially useful cues, structured noise and biases present in SLAM or VIO algorithm.

Sparse feature based methods are standard for SLAM or VIO techniques due to their high speed and accuracy. The detect-then-describe approach is the most common approach to sparse feature extraction, wherein, interest points are detected and then described for a patch around the point. The descriptor encapsulates higher level information, which is missed by typical low-level interest points such as corners, blobs, etc. Prior to the deep learning revolution, classical systems like SIFT (see [Ref 28] and ORB (see [Ref 37] were ubiquitously used as descriptors for feature matching for low level vision tasks. Deep neural networks directly optimizing for the objective at hand have now replaced these hand engineered features across a wide array of applications. However, such an end-to-end network has remained elusive for SLAM (see [Ref. 32] due to the components being non-differentiable. General purpose descriptors learned by methods such as SuperPoint (see [Ref 9], LIFT (see [Ref 42]), and GIFT (see [Ref 27] aim to bridge the gap towards differentiable SLAM.

MVS approaches either directly reconstruct a 3D volume or output a depth map which can be flexibly used for 3D reconstruction or other applications. Methods of reconstructing 3D volumes (see [Ref 41, 5] are restricted to small spaces or isolated objects either due to the high memory load of operating in a 3D voxelized space (see [Refs. 35, 39], or due to the difficulty of learning point representations in complex environments (see [Ref. 34]). The use of multi-view images captured in indoor environments has progressed lately starting with DeepMVS (see [Ref. 18]) which proposed a learned patch matching approach. MVDepthNet (see [Ref 40]), and DPSNet (see [Ref 19] build a cost volume for depth estimation. Recently, GP-MVSNet (see [Ref 17]) built upon MVDepthNet to coherently fuse temporal information using Gaussian processes. All these methods utilize the plane sweep algorithm during some stage of depth estimation, resulting in an accuracy vs efficiency trade-off.

Sparse-to-dense depth estimation has also recently emerged as a way to supplement active depth sensors due to their range limitations when operating on a power budget, and to fill in depth in hard to detect regions such as dark or reflective objects. One approach was proposed by Ma et. al (see [Ref 30], which was followed by Chen et. al. (see [Ref. 6, 43]) which introduced innovations in the representation and network architecture. A convolutional spatial propagation module is proposed in [Ref. 7] to in-fill the missing depth values. Recently, self-supervised approaches (see [Refs. 13, 12]) have been explored for the sparse-to-dense problem. (See [Ref. 29]).

It can be seen that multi-view stereo (MVS) represents an advantageous middle approach between the accuracy of active depth sensing and the practicality of monocular depth estimation. Cost volume based approaches employing 3D convolutional neural networks (CNNs) have considerably improved the accuracy of MVS systems. However, this accuracy comes at a high computational cost which impedes practical adoption.

Accordingly, there is a need for improved systems and methods for depth estimation of a scene which does not depend on costly and ineffective active depth sensing, and improves upon the efficiency and/or accuracy of prior passive depth sensing techniques. In addition, the systems and methods for depth estimation should be implementable in XR systems having displays which are lightweight, low-cost, have a small form-factor, have a wide virtual image field of view, and are as transparent as possible.

SUMMARY

The embodiments disclosed herein are directed to systems and methods for estimating depths of features in a scene or environment surrounding a user of a spatial computing system, such as an XR system, in an end-to-end process. The estimated depths can be utilized by a spatial computing system, for example, to provide an accurate and effective 3D XR experience. The resulting 3D XR experience is displayable in a rich, binocular, three-dimensional experience that is comfortable and maximally useful to the user, in part because it can present images in a manner which addresses some of the fundamental aspects of the human perception system, such as the vergence-accommodation mismatch. For instance, the estimated depths may be used to generate a 3D reconstruction having accurate depth data enabling the 3D images to be displayed in multiple focal planes. The 3D reconstruction may also enable accurate management of interactions between virtual objects, other virtual objects, and/or real world objects.

Accordingly, one embodiment is directed to a method for estimating depth of features in a scene from multi-view images. First, multi-view images are obtained, including an anchor image of the scene and a set of reference images of the scene. This may be accomplished by one or more suitable cameras, such as cameras of an XR system. The anchor image and reference images are passed through a shared RGB encoder and descriptor decoder which (1) outputs a respective descriptor field of descriptors for the anchor image and each reference image, (ii) detects interest points in the anchor image in conjunction with relative poses to determine a search space in the reference images from alternate view-points, and (iii) outputs intermediate feature maps. The respective descriptors are sampled in the search space of each reference image to determine descriptors in the search space and matching the identified descriptors with descriptors for the interest points in the anchor image. The matched descriptors are referred to as matched keypoints. The matched keypoints are triangulated using singular value decomposition (SVD) to output 3D points. The 3D points are passed through a sparse depth encoder to create a sparse depth image from the 3D points and output feature maps. A depth decoder then generates a dense depth image based on the output feature maps for the sparse depth encoder and the intermediate feature maps from the RGB encoder.

In another aspect of the method, the shared RGB encoder and descriptor decoder may comprise two encoders including an RGB image encoder and a sparse depth image encoder, and three decoders including an interest point detection encoder, a descriptor decoder, and a dense depth prediction encoder.

In still another aspect, the shared RGB encoder and descriptor decoder may be a fully-convolutional neural network configured to operate on a full resolution of the anchor image and transaction images.

In yet another aspect, the method may further comprise feeding the feature maps from the RGB encoder into a first task-specific decoder head to determine weights for the detecting of interest points in the anchor image and outputting interest point descriptions.

In yet another aspect of the method, the descriptor decoder may comprise a U-Net like architecture to fuse fine and course level image information for matching the identified descriptors with descriptors for the interest points.

In another aspect of the method, the search space may be constrained to a respective epipolar line in the reference images plus a fixed offset on either side of the epipolar line, and within a feasible depth sensing range along the epipolar line.

In still another aspect of the method, bilinear sampling may be used by the shared RGB encoder and descriptor decoder to output the respective descriptors at desired points in the descriptor field.

In another aspect of the method, the step of triangulating the matched keypoints comprises estimating respective two dimensional (2D) positions of the interest points by computing a softmax across spatial axes to output cross-correlation maps; performing a soft-argmax operation to calculate the 2D position of joints as a center of mass of corresponding cross-correlation maps; performing a linear algebraic triangulation from the 2D estimates; and using a singular value decomposition (SVD) to output 3D points.

Another disclosed embodiment is directed to a cross reality (XR) system which is configured to estimate depths, and utilized such depths as described herein. The cross reality system comprises a head-mounted display device having a display system. For example, the head-mounted display may have a pair of near-eye displays in an eyeglasses-like structure. A computing system is in operable communication with the head-mounted display. A plurality of camera sensors are in operable communication with the computing system. The computing system is configured to estimate depths of features in a scene from a plurality of multi-view images captured by the camera sensors any of the methods described above. In additional aspects of the cross reality system, the process may include any one or more of the additional aspects of the cross reality system described above. For instance, the process may include obtaining a multi-view images, including an anchor image of the scene and a set of reference images of a scene within a field of view of the camera sensors from the camera sensors; passing the anchor image and reference images through a shared RGB encoder and descriptor decoder which (1) outputs a respective descriptor field of descriptors for the anchor image and each reference image, (ii) detects interest points in the anchor image in conjunction with relative poses to determine a search space in the reference images from alternate view-points, and (iii) outputs intermediate feature maps; sampling the respective descriptors in the search space of each reference image to determine descriptors in the search space and matching the identified descriptors with descriptors for the interest points in the anchor image, such matched descriptors referred to as matched keypoints; triangulating the matched keypoints using singular value decomposition (SVD) to output 3D points; passing the 3D points through a sparse depth encoder to create a sparse depth image from the 3D points and output feature maps; and a depth decoder generating a dense depth image based on the output feature maps for the sparse depth encoder and the intermediate feature maps from the RGB encoder.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

The drawings illustrate the design and utility of preferred embodiments of the present disclosure, in which similar elements are referred to by common reference numerals. In order to better appreciate how the above-recited and other advantages and objects of the present disclosure are obtained, a more particular description of the present disclosure briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings.

FIG. 8 shows a Table 1 having a comparison of the performance of different descriptors on ScanNet.

FIG. 9 shows a Table 2 having a comparison of the performance of depth estimation on ScanNet.

FIG. 10 shows a Table 3 having a comparison of the performance of depth estimation on ScanNet for different numbers of images.

FIG. 11 shows a Table 4 having a comparison of depth estimation on Sun3D.

FIG. 12 sets forth an equation for a process for the descriptor of each interest point being convolved with the descriptor field along its corresponding epipolar line for each image view-point as used in the method of FIG. 2, according to one embodiment.

FIGS. 13-16 set forth equations for a process for an algebraic triangulation to obtain 3D points as used in the method of FIG. 2, according to one embodiment.

DETAILED DESCRIPTION

The following describes various embodiments of systems and methods for estimating depths of features in a scene or environment surrounding a user of a spatial computing system, such as an XR system, in an end-to-end process. The various embodiments are described in detail with reference to the drawings, which are provided as illustrative examples of the disclosure to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

Furthermore, the systems and methods for estimating depths of features in a scene or environment surrounding a user of a spatial computing system may also be implemented independently of XR systems, and the embodiments depicted herein are described in relation to XR systems for illustrative purposes only.

Figure 1:
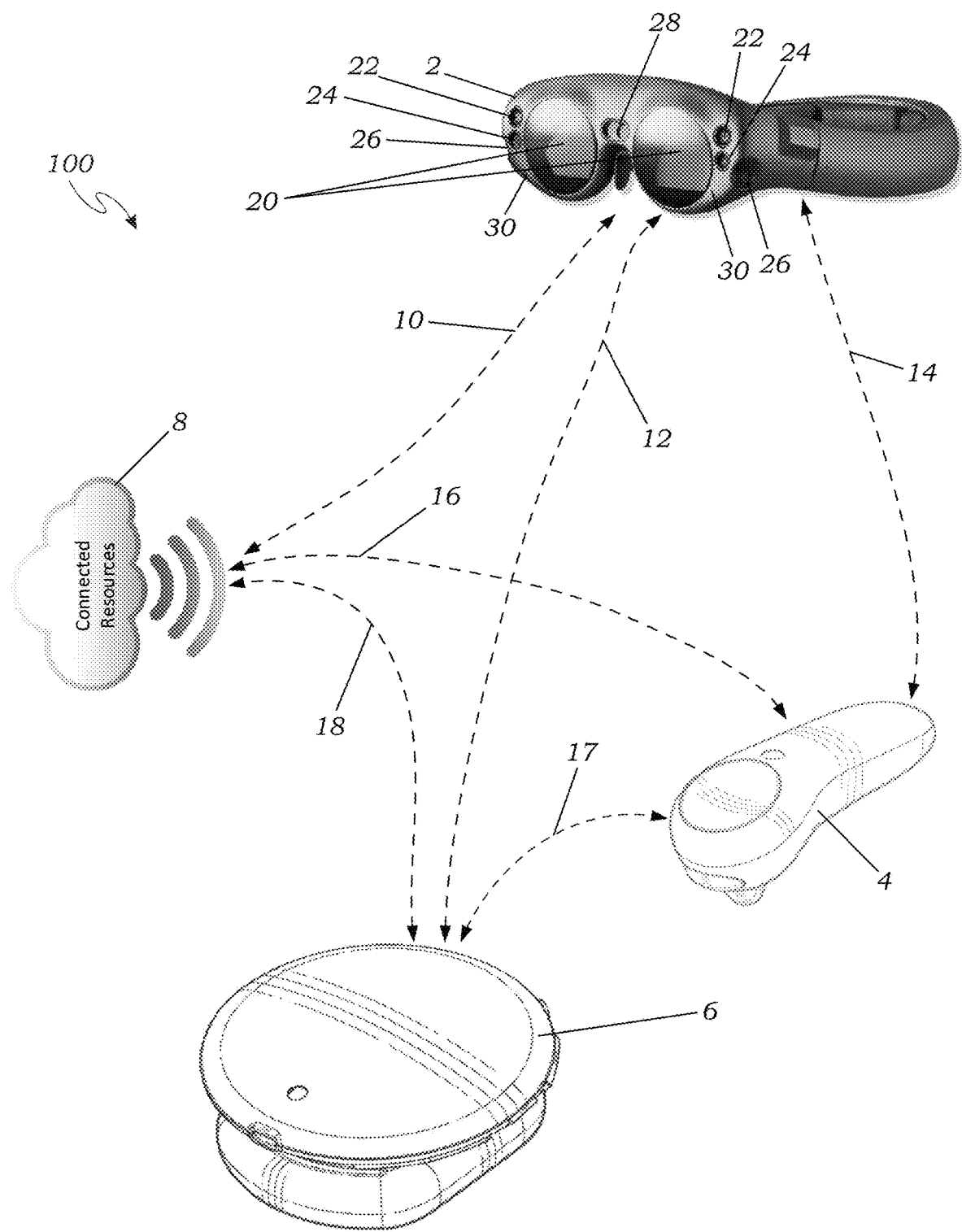
FIG. 1 is a schematic diagram of an exemplary cross reality system for providing a cross reality experience, according to one embodiment.

Referring to FIG. 1, an exemplary XR system 100 according to one embodiment is illustrated. The XR system 100 includes a head-mounted display device 2 (also referred to as a head worn viewing component 2), a hand-held controller 4 (also referred to as a hand-held controller component 4), and an interconnected auxiliary computing system or controller 6 (also referred to as an interconnected auxiliary computing system or controller component 6) which may be configured to be worn as a belt pack or the like on the user. Each of these components are in operable communication (i.e., operatively coupled) to each other and to other connected resources 8 (such as cloud computing or cloud storage resources) via wired or wireless communication connections 10, 12, 14, 16, 17, 18, such as those specified by IEEE 802.11, Bluetooth®, and other connectivity standards and configurations. The head-mounted display device 2 includes two depicted optical elements 20 through which the user may see the world around them along with video images and visual components produced by the associated system components, including a pair of image sources (e.g., micro-display panels) and viewing optics for displaying computer generated images on the optical elements 20, for an augmented reality experience. In the illustrated embodiment, the head-mounted display device 2 and pair of image sources are lightweight, low-cost, have a small form-factor, have a wide virtual image field of view, and are as transparent as possible. As illustrated in FIG. 1, the XR system 100 also includes various sensors configured to provide information pertaining to the environment around the user, including but not limited to various camera type sensors 22, 24, 26 (such as monochrome, color/RGB, and/or thermal), depth camera sensors 28, and/or sound sensors 30 (such as microphones).

In addition, it is desirable that the XR system 100 is configured to present virtual image information in multiple focal planes (for example, two or more) in order to be practical for a wide variety of use-cases without exceeding an acceptable allowance for vergence-accommodation mismatch. U.S. patent application Ser. Nos. 14/555,585, 14/690, 401, 14/331,218, 15/481,255, 62/627,155, 62/518,539, 16/229,532, 16/155,564, 15/413,284, 16/020,541, 62,702, 322, 62/206,765, 15,597,694, 16/221,065, 15/968,673, and 62/682,788, each of which is incorporated by reference herein in its entirety, describe various aspects of the XR system 100 and its components in more detail.

In various embodiments a user wears an augmented reality system such as the XR system 100 depicted in FIG. 1, which may also be termed a "spatial computing" system in relation to such system's interaction with the three dimensional world around the user when operated. The cameras 22, 24, 26 and computing system 6 are configured to map the environment around the user, and/or to create a "mesh" of such environment, comprising various points representative of the geometry of various objects within the environment around the user, such as walls, floors, chairs, and the like. The spatial computing system may be configured to map or mesh the environment around the user, and to run or operate software, such as that available from Magic Leap, Inc., of Plantation, Florida, which may be configured to utilize the map or mesh of the room to assist the user in placing, manipulating, visualizing, creating, and modifying various objects and elements in the three-dimensional space around the user. As shown in FIG. 1, the XR system 100 may also be operatively coupled to additional connected resources 8, such as other computing systems, by cloud or other connectivity configurations.

It is understood that the methods, systems and configurations described herein are broadly applicable to various scenarios outside of the realm of wearable spatial computing such as the XR system 100, subject to the appropriate sensors and associated data being available.

In contrast to prior systems and methods for depth estimation of scenes, the presently disclosed systems and methods learn the sparse 3D landmarks in conjunction with the sparse to dense formulation in an end-to-end manner so as to (a) remove dependence on a cost volume in the MVS technique, thus, significantly reducing compute, (b) complement camera pose estimation using sparse VIO or SLAM by reusing detected interest points and descriptors, (c) utilize geometry-based MVS concepts to guide the algorithm and improve the interpretability, and (d) benefit from the accuracy and efficiency of sparse-to-dense techniques. The network in the present systems and methods is a multitask model (see [Ref 22]), comprised of an encoder-decoder structure composed of two encoders, one for RGB image and one for sparse depth image, and three decoders: one interest point detection, one for descriptors and one for the dense depth prediction. A differentiable module is also utilized that efficiently triangulates points using geometric priors and forms the critical link between the interest point decoder, descriptor decoder, and the sparse depth encoder enabling end-to-end training.

These methods and configurations are broadly applicable to various scenarios outside of realm of wearable spatial computing, subject to the appropriate sensors and associated data being available.

One of the challenges in spatial computing relates to the utilization of data captured by various operatively coupled sensors (such as elements 22, 24, 26, 28 of the system of FIG. 1) of the XR system 100 in making determinations useful and/or critical to the user, such as in computer vision and/or object recognition challenges that may, for example, relate to the three-dimensional world around a user. Disclosed herein are methods and systems for generating a 3D reconstruction of a scene, such as the 3D environment surrounding the user of the XR system 100, using only RGB images, such as the RGB images from the cameras 22, 24, and 26, without using depth data from the depth sensors 28.

In contrast to previous methods of depth estimation of scenes, such as indoor environments, the present disclosure introduces an approach for depth estimation by learning triangulation and densification of sparse points for multi-view stereo. Distinct from cost volume approaches, the presently discloses systems and methods utilize an efficient depth estimation approach by first (a) detecting and evaluating descriptors for interest points, then (b) learning to match and triangulate a small set of interest points, and finally densifying this sparse set of 3D points using CNNs. An end-to-end network efficiently performs all three steps within a deep learning framework and trained with intermediate 2D image and 3D geometric supervision, along with depth supervision. Crucially, the first step of the presently disclosed method complements pose estimation using interest point detection and descriptor learning. The present methods are shown to produce state-of-the-art results on depth estimation with lower compute for different scene lengths. Furthermore, this method generalizes to newer environments and the descriptors output by the network compare favorably to strong baselines.

In the present disclosed method, the sparse 3D landmarks are learned in conjunction with the sparse to dense formulation in an end-to-end manner so as to (a) remove the dependence on a cost volume as in the MVS technique, thus, significantly reducing computational costs, (b) complement camera pose estimation using sparse VIO or SLAM by reusing detected interest points and descriptors, (c) utilize geometry-based MVS concepts to guide the algorithm and improve the interpretability, and (d) benefit from the accuracy and efficiency of sparse-to-dense techniques. The network used in the method is a multitask model (e.g., see [Ref 22]), comprised of an encoder-decoder structure composed of two encoders, one for RGB image and one for sparse depth image, and three decoders: one interest point detection, one for descriptors and one for the dense depth prediction. The method also utilizes a differentiable module that efficiently triangulates points using geometric priors and forms the critical link between the interest point decoder, descriptor decoder, and the sparse depth encoder enabling end-to-end training.

Figure 2:
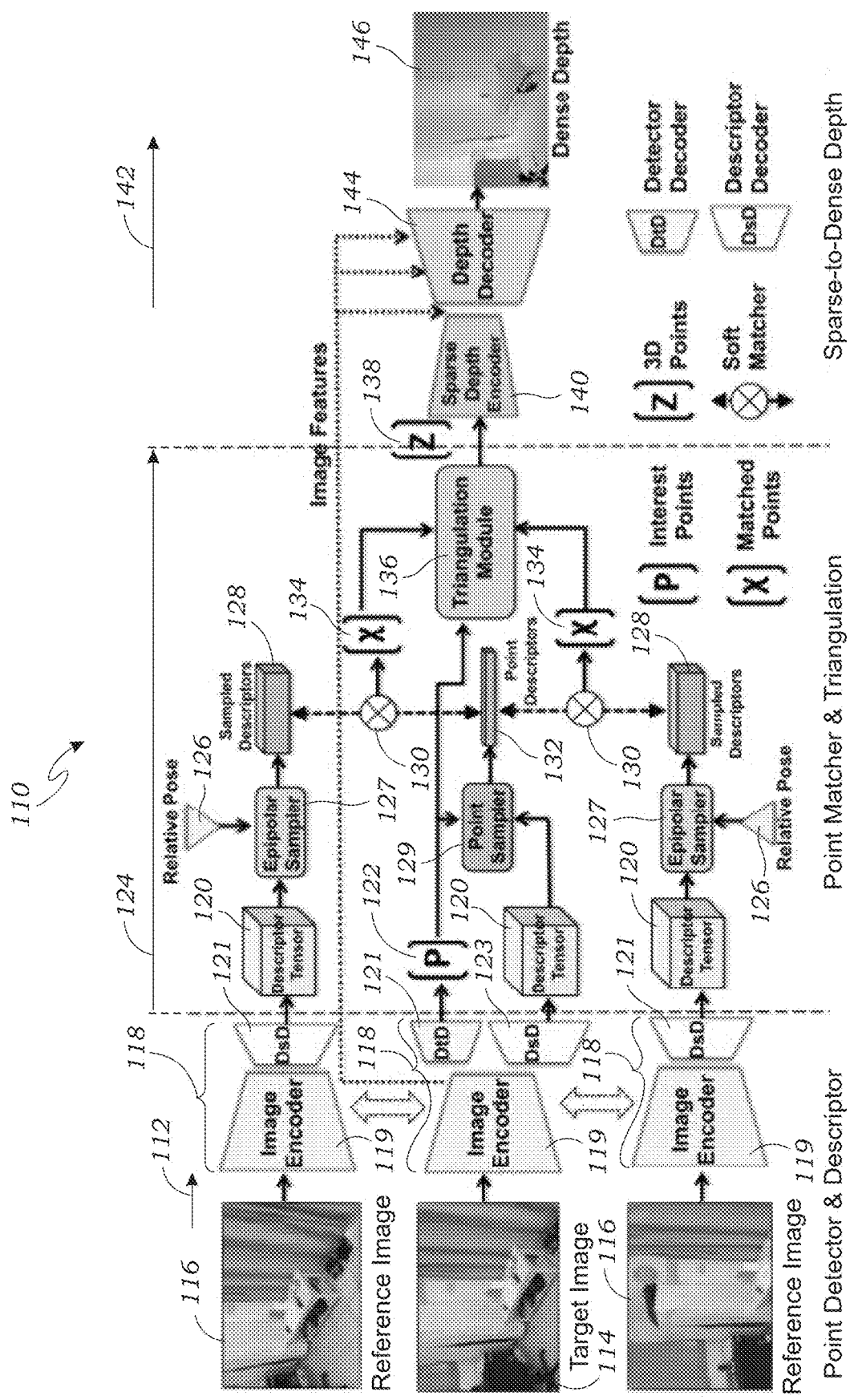
FIG. 2 is a schematic diagram of a method for depth estimation of a scene, according to one embodiment.

One embodiment of a method 110, as well as a system 110, for depth estimation of a scene is can be broadly sub-divided into three steps as illustrated in the schematic diagram of FIG. 2. The method 110 can be broadly sub-divided into three steps as illustrated FIG. 2. In the first step 112, the target or anchor image 114 and the multi-view images 116 are passed through a shared RGB encoder and descriptor decoder 118 (including an RGB image encoder 119, a detector decoder 121, and a descriptor decoder 123) to output a descriptor field 120 for each image 114, 116. Interest points 122 are also detected for the target or the anchor image 114. In the second step 124, the interest points 122 in the anchor image 114 in conjunction with the relative poses 126 are used to determine the search space in the reference images 116 from alternate view-points. Descriptors 132 are sampled in the search space using an epipolar sampler 127 and point sampler 129, respectively, to output sampled descriptors 128 and are matched by a soft matcher 130 with descriptors 128 for the interest points 122. Then, the matched keypoints 134 are triangulated using SVD using a triangulation module 136 to output 3D points 138. The output 3D points 138 are used by a sparse depth encoder 140 to create a sparse depth image. In the third and final step 142, the output feature maps for the sparse depth encoder 140 and intermediate feature maps from the RGB encoder 119 are collectively used to inform the depth decoder 144 and output a dense depth image 146. Each of the three steps are described in greater detail below.

As described above, the shared RGB encoder and descriptor decoder 118 is composed of two encoders, the RGB image encoder 119 and the sparse depth image encoder 140, and three decoders, the detector decoder 121 (also referred to as the interest point detector decoder 121), the descriptor decoder 123, and the dense depth decoder 144 (also referred to as dense depth predictor decoder 144). In one embodiment, the shared RGB encoder and descriptor decoder 118 may comprise a SuperPoint-like (see [Ref. 9]) formulation of a fully-convolutional neural network architecture which operates on a full-resolution image and produces interest point detection accompanied by fixed length descriptors. The model has a single, shared encoder to process and reduce the input image dimensionality. The feature maps from the RGB encoder 119 feed into two task-specific decoder "heads", which learn weights for interest point detection and interest point description. This joint formulation of interest point detection and description in SuperPoint enables sharing compute for the detection and description tasks, as well as the downstream task of depth estimation. However, SuperPoint was trained on grayscale images with focus on interest point detection and description for continuous pose estimation on high frame rate video streams, and hence, has a relatively shallow encoder. On the contrary, the present method is interested in image sequences with sufficient baseline, and consequently longer intervals between subsequent frames. Furthermore, SuperPoint's shallow backbone suitable for sparse point analysis has limited capacity for our downstream task of dense depth estimation. Hence, the shallow backbone is replaced with a ResNet-50 (see [Ref. 16]) encoder which balances efficiency and performance. The output resolution of the interest point detector decoder 121 is identical to that of SuperPoint. In order to fuse fine and coarse level image information critical for point matching, the method 110 may utilize a U-Net (see [Ref. 36]) like architecture for the descriptor decoder 123.

Figure 3:
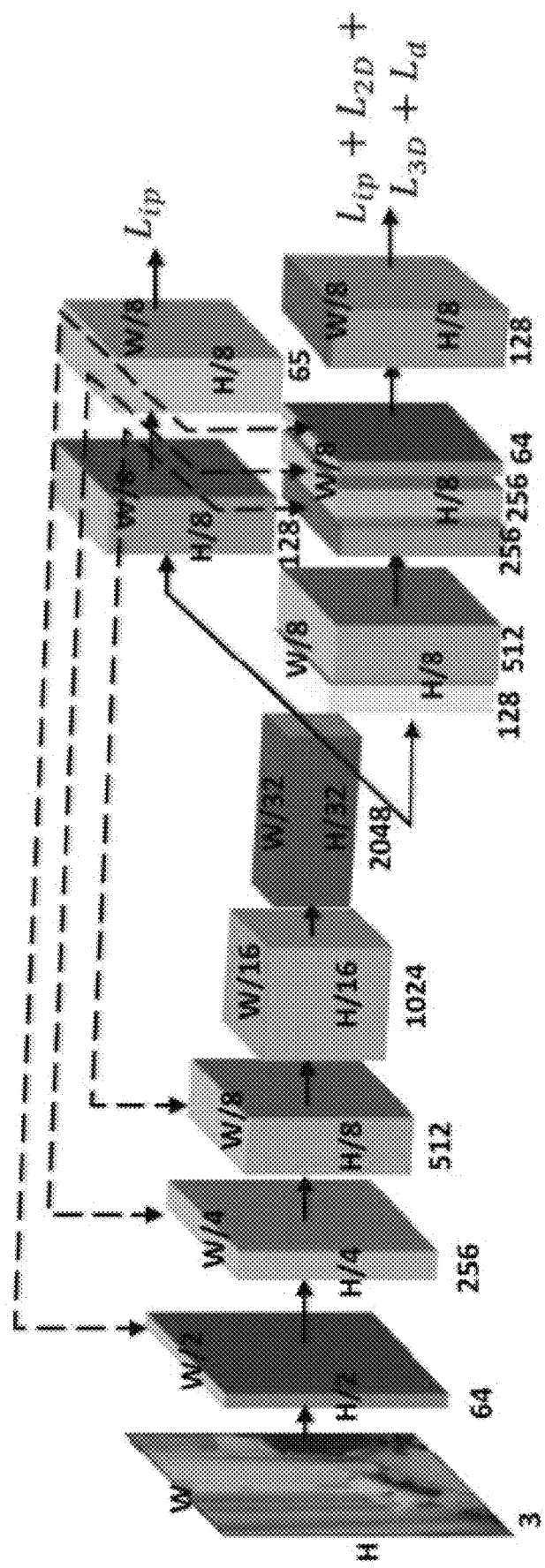
FIG. 3 is a block diagram of the architecture of a shared RGB encoder and descriptor decoder used in the method of FIG. 2, according to one embodiment.

The descriptor decoder 123 outputs an N-dimensional descriptor tensor 120 at ⅛th the image resolution, similar to SuperPoint. This architecture is illustrated in FIG. 3. The interest point detector network is trained by distilling the output of the original SuperPoint network and the descriptors are trained by the matching formulation described below.

Figure 4:
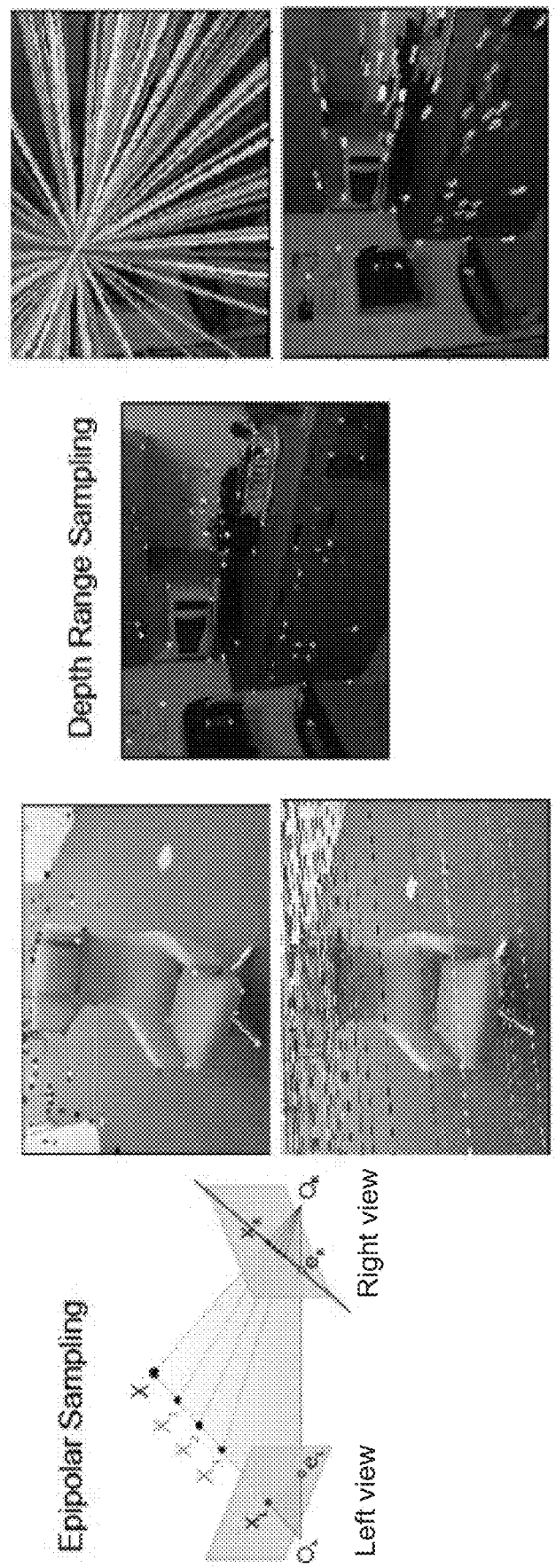
FIG. 4 illustrates a process for restricting the range of the search space using epipolar sampling and depth range sampling, as used in the method of FIG. 2, according to one embodiment.

The previous step provides interest points for the anchor image and descriptors for all images, i.e., the anchor image and full set of reference images. The next step 124 of the method 110 includes point matching and triangulation. A naïve approach would be to match descriptors of the interest points 122 sampled from the descriptor field 120 of the anchor image 114 to all possible positions in each reference image 116. However, this is computationally prohibitive. Hence, the method 110 invokes geometrical constraints to restrict the search space and improve efficiency. Using concepts from multi-view geometry, the method e100 only searches along the epipolar line in the reference images (see [FIG. 14]). The epipolar line is determined using the fundamental matrix, F, using the relation $xFx^T=0$, where x is the set of points in the image. The matched point is guaranteed to lie on the epipolar line in an ideal scenario. However, practical limitations to obtain perfect pose lead us to search along the epipolar line with a small fixed offset on either side. Furthermore, the epipolar line stretches for depth values from $-\infty$ to $\infty$. The search space is constrained to lie within a feasible depth sensing range from epipolar line, and the sampling rate is varied within this restricted range in order to obtain descriptor fields with the same output shape for implementation purposes as illustrated in FIG. 4. Bilinear sampling is used to obtain the descriptors at the desired points in the descriptor field 120. The descriptor of each interest point 122 is convolved with the descriptor field 120 along its corresponding epipolar line for each image viewpoint, as illustrated in Equation (1) of FIG. 12, and also reproduced below:

$$C_{j,k} = \hat{D}_j * D_j^k, \forall x \in \varepsilon, \quad (1)$$

where $\hat{D}$ is the descriptor field of the anchor image, $D^k$ is the descriptor field of the $k^{th}$ reference image, and convolved over all sampled points x along the clamped epipolar line E for point j. This effectively provides a cross-correlation map [2] between the descriptor field and interest point descriptors. High values in this map indicate potential key-point matches in the reference images to the interest points in the anchor image. In practice, we add batch normalisation [20] and ReLU non-linearity [23] to output $C_{j,k}$ in order to ease training.

To obtain the 3D points, the algebraic triangulation approach proposed in [Ref. 21] is followed. Each interest point j is processed independently of each other. The approach is built upon triangulating the 2D interest points along with the 2D positions obtained from the peak value in each cross correlation map. To estimate the 2D positions, the softmax across the spatial axes is first computed, as illustrated in Equation (2) of FIG. 13, and also reproduced below:

$$C'_{j,k} = \exp(C_{j,k}) / \left( \sum_{r_x=1}^{W} \sum_{r_y=1}^{H} \exp(C_{j,k}(r_x, r_y)) \right), \quad (2)$$

where, $C_{j,k}$ indicates the cross-correlation map for the $j^{th}$ inter-point and $k^{th}$ view, and W, H are spatial dimensions of the epipolar search line. Then we calculate the 2D positions of the joints as the enter of mass of the corresponding cross-correlation maps, also termed soft-argmax operation:

Then, using Equation (3) of FIG. 14 (also reproduced below), the 2D positions of the joints are calculated as the center of mass of the corresponding cross-correlation maps, also termed a soft-argmax operation:

$$x_{j,k} = \sum_{r_x=1}^{W} \sum_{r_y=1}^{H} r(x, y)(C'_{j,k}(r(x, y))) \tag{3}$$

An important feature of soft-argmax is that rather than getting the index of the maximum, it allows the gradients to flow back to cross-correlation maps $C_{j,k}$ from the output 2D position of the matched points $x_{j,k}$. In other words, unlike argmax, the soft-argmax operator is differentiable. To infer the 3D positions of the joints from their 2D estimates $x_{j,k}$ we use a linear algebraic triangulation approach. The method reduces the finding of the 3D coordinates of a point $z_j$ to solving the over-determined system of equations on homogeneous 3D coordinate vector of the point $\bar{z}$:

An important feature of the soft-argmax is that rather than getting the index of the maximum, it allows the gradients to flow back to cross-correlation maps $C_{j,k}$ from the output 2D position of the matched points $x_{j,k}$. In other words, unlike argmax, the soft-argmax operator is differentiable. To infer the 3D positions of the joints from their 2D estimates $x_{y,k}$, a linear algebraic triangulation approach is used. This method reduces the finding of the 3D coordinates of a point $z_j$ to solving the over-determined system of equations of homogeneous 3D coordinate vector of the point $\bar{z}$, as illustrated in Equation 4 of FIG. 15, and also reproduced below:

$$A_j \bar{z}_j = 0, \tag{4}$$

where $A_j \in R^{2k,A}$ is a matrix composed of the components from the full projection matrices and $x_{j,k}$. A naive triangulation algorithm assumes that the point coordinates from each view are independent of each other and thus all make comparable contributions to the triangulation. However, on some views the 2D point locations cannot be estimated reliably (e.g. due to occlusions, motion artifacts), leading to unnecessary degradation of the final triangulation result. This greatly exacerbates the tendency of methods that optimise algebraic reprojection error to pay uneven attention to different views. The problem can be solved by applying RANSAC together with the Huber loss (used to score reprojection errors corresponding to inliers). However, this has its own drawbacks. E.g. using RANSAC may completely cut off the gradient flow to the excluded view. To address the aforementioned problems, we add weights $w_k$ to the coefficients of the matrix corresponding to different view:

A naïve triangulation algorithm assumes that the point coordinates from each view are independent of each other and thus all make comparable contributions to the triangulation. However, one some views the 2D point locations cannot be estimated reliably (e.g., due to occlusions, artifacts, etc.), leading to unnecessary degradation of the final triangulation result. This greatly exacerbates the tendency of methods that optimize algebraic reprojection error to pay uneven attention to different views. The problem can be solved by applying Random Sample Consensus (RANSAC) together with the Huber loss (used to score reprojection errors corresponding to inliers). However, this has its own drawbacks. E.g., using RANSAC may completely cut off the gradient flow to the excluded view. To address the aforementioned problems, weights $w_k$ are added to the coefficients of the matrix corresponding to different views, as illustrated in Equation (5) of FIG. 16. The weights w are set to be the maximum value in each cross-correlation map. This allows the contribution of each camera view to be weighted less while triangulating the interest point. Note the confidence value of the interest points are set to be 1. Equation (5) of FIG. 16, reproduced below, is solved via differentiable Singular Value Decomposition (SVD) of the matrix B $UDV^T$, from which $\bar{z}$ is set as the last column of V.

$$(w_j A_j) = \bar{z}_j = 0, \tag{5}$$

The weights w are set to be the max value in each cross-correlation map. This allows the contribution of the each camera view to be controlled by the quality of match, and low-confidence matches to be weighted less while triangulating the interest point. Note the confidence value of the interest points are wet to be 1. The above equation is solved via differentiable Singular Value Decomposition of the matrix $B=UDV^T$, from which $\bar{z}$ is set as the last column of V. The final non-homogeneous value of z is obtained by dividing the homogeneous 3D coordinate vector $\bar{z}$ by its fourth coordinate: $z=\bar{z}/(\bar{z})_4$.

The final non-homogenous value of z is obtained by dividing the homogenous 3D coordinate vector $\bar{z}$ by its fourth coordinate $\bar{z}=\bar{z}/(\bar{z})_4$.

Figure 5:
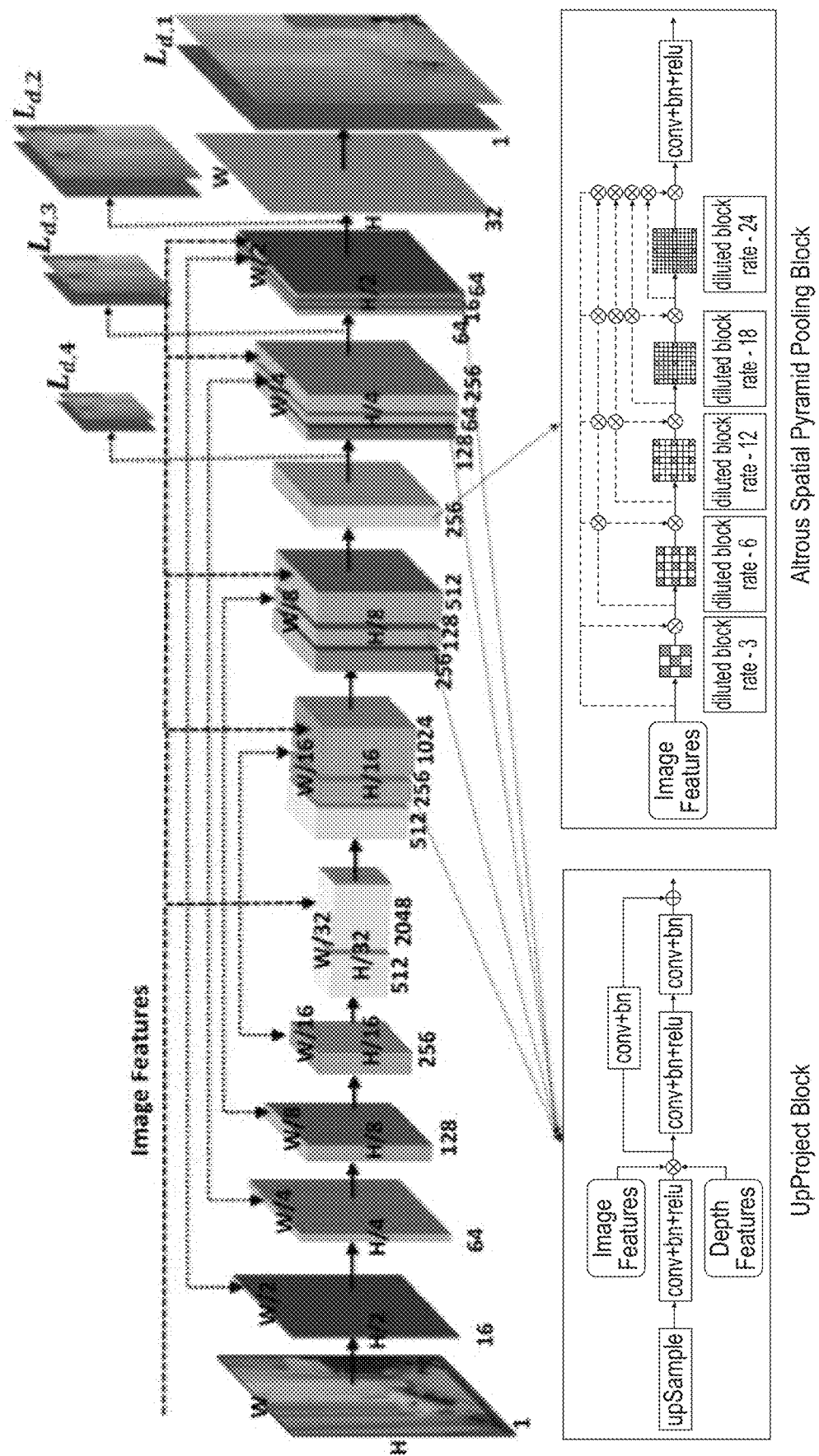
FIG. 5 is a block diagram illustrating the architecture for a key-point network, as used in the method of FIG. 2, according to one embodiment.

Next, step 142 of method 110, including the densification of sparse depth points will be described. A key-point detector network provides the position of the points. The z coordinate of the triangulated points provides the depth. A sparse depth image of the same resolution as the input image is imputed with depth of these sparse points. Note that the gradients can propagate from the sparse depth image back to the 3D key-points all the way to the input image. This is akin to switch unpooling in SegNet (see [Ref. 1]). The sparse depth image is passed through an encoder network which is a narrower version of the image encoder network 119. More specifically, a ResNet-50 encoder with the channel widths is used after each layer to be one fourth of the image encoder. These features are concatenated with the features obtained from the image encoder 119. A U-net style decoder with intermediate feature maps from both the image as well as sparse depth encoder concatenated with the intermediate feature maps of the same resolution in the decoder is used, similar to [Ref 6]. Deep supervision over 4 scales is provided. (See [Ref 25]). A spatial pyramid pooling block is also included to encourage feature mixing at different receptive field sizes. (See [Refs. 15, 4]). The details of this architecture are shown in FIG. 5.

The overall training objective will now be described. The entire network is trained with a combination of (a) cross entropy loss between the output tensor of the interest point detector decoder and ground truth interest point locations obtained from SuperPoint, (b) a smooth-L1 loss between the 2D points output after soft argmax and ground truth 2D point matches, (c) a smooth-L1 loss between the 3D points output after SVD triangulation and ground truth 3D points, (d) an edge aware smoothness loss on the output dense depth map, and (e) a smooth-L1 loss over multiple scales between the predicted dense depth map output and ground truth 3D depth map. The overall training objective is:

$$L = w_{ip}L_{ip} + w_{2d}L_{2d} + w_{3d}L_{3d} + w_{sm}L_{sm} + \sum_i w_{d,i}L_{d,i}, \quad (6)$$

where $L_{ip}$ is the interest point detection loss, $L_{2d}$ is the 2D matching loss, $L_{3d}$ is the 3D triangulation loss, $L_{sm}$ is the smoothness loss, and $L_{d,i}$ is the depth estimation loss at scale i for 4 different scales ranging from original image resolution to $\frac{1}{16}^{th}$ the image resolution.

Examples

Implementation Details:

Training: Most MVS datasets are trained on the DEMON dataset. However, the DEMON dataset mostly contains pairs of images with the associated depth and pose information. Relative confidence estimation is crucial to accurate triangulation in our algorithm, and needs sequences of length three or greater in order to estimate the confidence accurately and holistically triangulate an interest point. Hence, we divulge from traditional datasets for MVS depth estimation, and instead use ScanNet (see [Ref 8]). ScanNet is an RGB-D video dataset containing 2.5 million views in more than 1500 scans, annotated with 3D camera poses, surface reconstructions, and instance-level semantic segmentations. Three views from a scan at a fixed interval of 20 frames along with the pose and depth information form a training data point in our method. The target frame is passed through SuperPoint in order to detect interest points, which are then distilled using the loss $L_{ip}$ while training our network. We use the depth images to determine ground truth 2D matches, and unproject the depth to determine the ground truth 3D points. We train our model for 100K iterations using PyTorch framework with batch-size of 24 and ADAM optimizer with learning rate 0.0001 ($\beta 1$=0.9, $\beta 2$=0.999). We fix the resolution of the image to be qVGA (240×320) and number of interest points to be 512 in each image with at most half the interest points chosen from the interest point detector thresholded at 5e-4, and the rest of the points chosen randomly from the image. Choosing random points ensures uniform distribution of sparse points in the image and helps the densification process. We set the length of the sampled descriptors along the epipolar line to be 100, albeit, we found that the matching is robust even for lengths as small as 25. We empirically set the weights to be [0.1,1.0, 2.0,1.0,2.0].

Evaluation: The ScanNet test set consists of 100 scans of unique scenes different for the 707 scenes in the training dataset. We first evaluate the performance of our detector and descriptor decoder for the purpose of pose estimation on ScanNet. We use the evaluation protocol and metrics proposed in SuperPoint, namely the mean localization error (MLE), the matching score (MScore), repeatability (Rep) and the fraction of correct pose estimated using descriptor matches and PnP algorithm at 5° (5 degree) threshold for rotation and 5 cm for translation. We compare against SuperPoint, SIFT, ORB and SURF at a NMS threshold of 3 pixels for Rep, MLE, and MScore as suggested in the SuperPoint paper. Next, we use standard metrics to quantitatively measure the quality of our estimated depth::absolute relative error (Abs Rel), absolute difference error (Abs diff), square relative error (Sq Rel), root mean square error and its log scale (RMSE and RMSE log) and inlier ratios ($\delta$<1.25i where $i \in 1, 2, 3$).

We compare our method to recent deep learning approaches for MVS: (a) DPSNet: Deep plane sweep approach, (b) MVDepthNet: Multi-view depth net, and (c) GP-MVSNet temporal non-parametric fusion approach using Gaussian processes. Note that these methods perform much better than traditional geometry based stereo algorithms. Our primary results are on sequences of length 3, but we also report numbers on sequences of length 2, 4, 5 and 7 in order to understand the performance as a function of scene length. We evaluate the methods on Sun3D dataset, in order to understand the generalization of our approach to other indoor scenes. We also discuss the multiply-accumulate operations (MACs) for the different methods to understand the operating efficiency at run-time.

Descriptor Quality:

Table 1 in FIG. 8 shows the results of our detector and descriptor evaluation. Note that MLE and repeatability are detector metrics, MScore is a descriptor metric, and rotation@5 and translation@5 are combined metrics. We set the threshold for our detector at 0.0005, the same as that used during training. This results in a large number of interest points being detected (Num) which artificially inflates the repeatability score (Rep) in our favor, but has poor localization performance as indicated by MLE metric. However, our MScore is comparable to SuperPoint although we trained our network to only match along the epipolar line, and not for the full image. Furthermore, we have the best rotation@5 and translation@5 metric indicating that the matches found using our descriptors help accurately determine rotation and translation, i.e., pose. These results indicate our training procedure can complement the homographic adaptation technique of SuperPoint and boost the overall performance.

Figure 6:
FIG. 6 illustrates a qualitative comparison between an example of the method of FIG. 2 and various other different methods.
Figure 7:
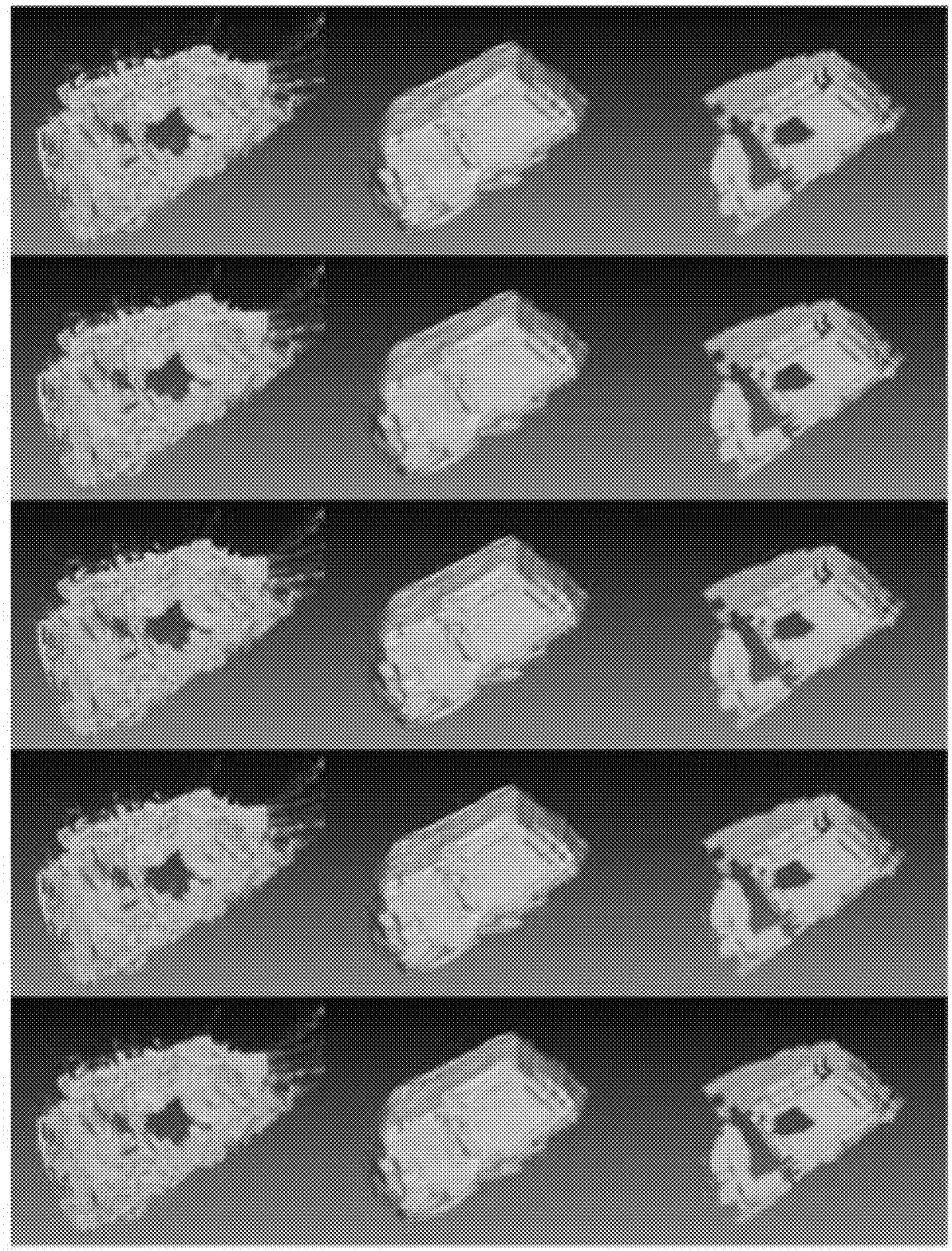
FIG. 7 shows sample 3D reconstructions of the scene from the estimated depth maps I the example of the method of FIG. 2, described herein.

Depth Results:

We set the same hyper-parameters for evaluating our network for all scenarios and across all datasets, i.e., fix the number of points detected to be 512, length of the sampled descriptors to be 100, and the detector threshold to be 5e-4. In order to ensure uniform distribution of the interest points and avoid clusters, we set a high NMS value of 9 as suggested in [Ref. 9]. The supplement has ablation study over different choices of hyper parameters. Table 2 of FIG. 9 shows the performance of depth estimation on sequences of length 3 and gap 20 as used in the training set. For fair comparison, we evaluate two versions of the competing approaches: (1) we provided open source trained model, (2) the trained model fine tuned on ScanNet for 100K iterations with the default training parameters as suggested in the manuscript or made available by the authors. We use a gap of 20 frames to train each network, similar to ours. The fine-tuned models are indicated by the suffix '-FT' in Table 2 of FIG. 9. Unsurprisingly, the fine-tuned models fare much better than the original models on ScanNet evaluation. MVDepthNet has the least improvement after fine-tuning, which can be attributed to the heavy geometric and photometric augmentation used during training, hence making it generalize well. DPSNet benefits maximally from fine-tuning with over 25% drop in absolute error. However, our network according to the presently disclosed methods outperforms all methods across all metrics. FIG. 6 shows a qualitative comparison between the different methods and FIG. 7 shows sample 3D reconstructions of the scene from the estimated depth maps.

An important feature of any multiview stereo method is the ability to improve with more views. Table 3 of FIG. 10 shows the performance for different numbers of images. We set the frame gap to be 20, 15, 12 and 10 for 2, 4, 5 and 7 frames respectively. These gaps ensure that each set approximately span the similar volumes in 3D space, and that any performance improvement emerges from the network better using the available information as opposed to acquiring new information. We again see that the method disclosed herein outperforms all other methods on all three metrics for different sequence lengths. Closer inspection of the values indicates that the DPSNet and GPMVSNet does not benefit from additional views, whereas, MVDepthNet benefits from a small number of additional views but stagnates for more than 4 frames. On the contrary, the presently disclosed method shows steady improvement in all three metrics with additional views. This can be attributed to our point matcher and triangulation module which naturally benefits from additional views.

As a final experiment, we test our network on Sun3D test dataset consisting of 80 pairs of images. Sun3D also captures indoor environments, albeit at a much smaller scale compared to ScanNet. Table 4 of FIG. 11 shows the performance from the two versions of DPSNet and MVDepthNet discussed previously, as compared to our network according to the disclosed embodiments. Note DPSNet and MVDepthNet were originally trained on the Sun3D training database. The fine-tuned version of DPSNet performs better than the original network on the Sun3D test set owing to the greater diversity in ScanNet training database. MVDepthNet on the contrary performs worse, indicating that it overfit to ScanNet and the original network was sufficiently trained and generalized well. Remarkably, our method according to the embodiments disclosed herein again outperforms both methods although our trained network has never seen any image from the Sun3D database. This indicates that our principled way of determining sparse depth, and then densifying has good generalizability.

Next, we evaluate the total number of multiply-accumulate operations (MACs) needed for our approach according to the disclosed embodiments. For a 2 image sequence, we perform 16.57 Giga Macs (GMacs) for the point detector and descriptor module, less than 0.002 GMacs for the matcher and triangulation module, and 67.90 GMacs for the sparse-to-dense module. A large fraction of this is due to the U-Net style feature tensors connecting the image and sparse depth encoder to the decoder. We perform a total of 84.48 GMacs to estimate the depth for a 2 image sequence. This is considerably lower than DPSNet which performs 295.63 GMacs for a 2 image sequence, and also less than the real-time MVDepthNet which performs 134.8 GMacs for a pair of images to estimate depth. It takes 90 milliseconds to estimate depth on NVidia TiTan RTX GPU, which we evaluated to be 2.5 times faster than DPSNet. We believe our presently disclosed method can be further sped up by replacing Pytorch's native SVD with a custom implementation for the triangulation. Furthermore, as we do not depend on a cost volume, compound scaling laws as those derived for image recognition and object detection can be straightforwardly extended to make our method more efficient.

The presently disclosed methods for depth estimation provide an efficient depth estimation algorithm by learning to triangulate and densify sparse points in a multi-view stereo scenario. On all of the existing benchmarks, the methods disclosed herein have exceeded the state-of-the-art results, and demonstrated significant computation efficiency of competitive methods. It is anticipated that these methods can be expanded on by incorporating more effective attention mechanisms for interest point matching, and more anchor supporting view selection. The methods may also incorporate deeper integration with the SLAM problem as depth estimation and SLAM are duals of each other.

Appendix 1: The references listed below correspond to the references in brackets ("[Ref. ##]"), above; each of these references is incorporated by reference in its entirety herein.
1. Badrinarayanan, V., Kendall, A., Cipolla, R.: Segnet: A deep convolutional encoder-decoder architecture for image segmentation (2015)
2. Bertinetto, L., Valmadre, J., Henriques, J. F., Vedaldi, A., Torr, P. H.: Fully-convolutional siamese networks for object tracking. In: European conference on computer vision. pp. 850-865, Springer (2016)
3. Chang, J. R., Chen, Y. S.: Pyramid stereo matching network. In: Proceedings of the IEEE Conference on Computer Vision and Pattern Recognition. pp. 5410-5418 (2018)
4. Chen, L. C., Papandreou, G., Schroff, F., Adam, H.: Rethinking atrous convolution for semantic image segmentation. arXiv preprint arXiv:1706.05587 (2017)
5. Chen, R., Han, S., Xu, J., Su, H.: Point-based multi-view stereo network. In: Proceedings as of the IEEE International Conference on Computer Vision. pp. 1538-1547 (2019)
6. Chen, Z., Badrinarayanan, V., Drozdov, G., Rabinovich, A.: Estimating depth from rgb and sparse sensing. In: Proceedings of the European Covalence on Computer Vision (ECCV). pp. 167-182 (2018)
7. Cheng, X., Wang, P., Yang, R.: Depth estimation via affinity learned with convolutional spatial propagation network. In: Proceedings of the European Conference on Computer Vision (ECCV). pp. 103-119 (2018)
8. Dai, A., Chang, A. X., Savva, M., Halber, M., Funkhouser, T., Nießuer, M.: Seannet: Richly-annotated 3d reconstructions of indoor scenes. In: Proc. Computer Vision and Pattern Recognition (CVPR), IEEE (2017)
9. DeTone, D., Malisiewicz, T., Rabinovich, A.: Superpoint: Self-supervised interest point detection and description. In: 2018 IEEE/CVP Conference on Computer Vision and Pattern Recognition Workshops (CVPRW). pp. 337-33712 (June 2018). https://doi.org/10.1109/CVPRW.2018.00060
10. Eigen, D., Fergus, R.: Predicting depth, surface normals and semantic labels with a common multi-scale convolutional architecture. In: Proceedings of the IEEE international conference on computer vision. pp. 2650-2658 (2015)
11. Fu, H., Gong, M., Wang, C., Batmanghelich, K., Tao, D.: Deep ordinal regression network for monocular depth estimation. In: Proceedings of the IEEE Conference on Computer Vision and Pattern Recognition. pp. 2002-2011 (2018)
12. Garg, R., B G, V. K., Carneiro, G., Reid, I.: Unsupervised vises iron for since view depth estimation: Geometry to the rescue. In: European Conference on Computer Vision. pp. 740-756. Springer (2016)
13. Godard, C., Mac Aodha, O., Brostow, C. J.: Unsupervised monocular depth estimation with left-right consistency. In: Proceedings of the IEEE Conference on Computer Vision and Pattern Recognition. pp. 270279 (2017)
14. Hartley, R., Zisserman, A.: Multiple view geometry in computer vision. Cambridge university press (2003)
15. He, K., Zhang, X., Ren, S., Sun, J.: Spatial pyramid pooling in deep convolutional networks for visual recognition. IEEE transactions on pattern analysis and machine intelligence 37(9), 1904-1916 (2015)
16. He, K., Zhang, X., Ren, S., Sun, J.: Deep residual learning for image recognition. In: Proceedings of the IEEE conference on computer vision and pattern recognition. pp. 770-778 (2016)

17. Hon, Y., Kannala, J., Solin, A.: Multi-view stereo by temporal nonparametric fusion. In: Proceedings of the IEEE international Conference on Computer Vision. pp. 2651-2660 (2019)
18. Huang, P. H., Matzen, K., Kopf, J., Abuja, N., Huang, J. B.: Deepmvs: Learning multi-view stereopsis. In: Proceedings of the IEEE Conference on Computer Vision and Pattern Recognition. pp. 2821-2830 (2018)
19. Im, S., Jeon, H. G., Lin, S., Kweon, I. S., Dpsnet: End-to-end deep plane sweep stereo. In: 7th International Conference on Learning Representations, ICLR 2019. International Conference on Learning Representations, ICLR (2019)
20. Ioffe, S., Szegedy, C.: Batch normalization.: Accelerating deep network training by reducing internal covariate shift. arXiv preprint arXiv:1502.03167 (2015)
21. Iskakov, K., Burkov, E., Lempitsky, V., Malkov, Y.: Learnable triangulation of human pose. In: Proceedings of the IEEE International Conference on Computer Vision. pp. 7718-7727 (2019)
22. Kendall, A., Gal, Y., Cipolla, R.: Multi-task learning using uncertainty to weigh losses for scene geometry and semantics. In: Proceedings of the IEEE conference on computer vision and pattern recognition. pp. 7482-7491 (2018)
23. Krizhevsky, A., Sutskever, I., Hinton, G. E.: Imagenet classification with deep convolutional neural networks. In: Advances in neural information processing systems. pp. 1097-11115 (2012)
24. Lasinger, K., Ranftl, R., Schindler, K., Koltun, V.: Towards robust monocular depth estimation: Mixing datasets for zero-shot cross-dataset transfer. arXiv preprint arXiv:1907.01341 (2019)
25. Lee, C. Y., Xie, S., Gallagher, P., Zhang, Z., Tu, Z.: Deeply-supervised nets. In: Artificial intelligence and statistics. pp. 562-570 (2015)
26. Lee, J. H., Han, M. K., Ku, D. W., Suh, I. H.: From big to small: Multi-scale local planar guidance for monocular depth estimation. arXiv preprint arXiv:1907.10326 (2019)
27. Lin, Y., Shen, Z., Lin, Z., Peng, S., Rao, H., Zhou, X.: Gift: Learning transformation-invariant dense visual descriptors via group cons. In: Advances in Neural Information Processing Systems. pp. 6990-7001 (2019)
28. Lowe, D. G.: Distinctive image features from scale-invariant keypoints. International journal of computer vision 60(2), 91-110 (20134)
29. Ma, F., Cavalheiro, G. V., Karaman, S.: Self-supervised sparse-to-dense: Self-supervised depth completion from lidar and monocular camera. In: 2019 International Conference on Robotics and Automation (ICRA). pp. 3288-3295. IEEE (2019)
30. Ma, F., Karaman, S.: Sparse-to-dense: Depth prediction from sparse depth samples and a single image (2018)
31. Mur-Artal, R., Montiel, J. M. M., Tardos, J. D.; Orb-slam: a versatile and accurate monocular slam system. IEEE transactions on robotics; 31(5), 1147-1103 (2015)
32. Murthy Jatavallabhula, K., Iyer, G., Paull, L.: gradslam: Dense slam meets automatic differentiation. arXiv preprint arXiv:1910.10672 (2019)
33. Nistér, D., Naroditsky, O., Bergen, J.: Visual odometry. In: Proceedings of the 2004 IEEE Computer Society Conference on Computer Vision and Pattern Recognition, 2004. CVPR 2004. vol. 1, pp. I-I. Ieee (2004)
34. Qi, C. R., Su, H., Mo, K., Guibas, L. J.: Pointnet: Deep learning on point sets for 3d classification and segmentation. In: Proceedings of the IEEE conference on computer vision and pattern recognition. pp. 652-660 (2017)
35. Riegler, G., Osman Ulusoy, A., Geiger, A.: Octnet: Learning deep 3d representations at high resolutions. In: Proceedings of the IEEE Conference on Computer Vision and Pattern Recognition. pp. 3577-3586 (21317)
36. Ronneberger, O., Fischer, P., Brox, T.: U-net: Convolutional networks for biomedical image segmentation. In: International Conference on Medical image computing and computer-assisted intervention. pp. 234-241. Springer (2015)
37. Rublee, E., Rabaud, V., Konolige, K., Bradski, G.: Orb: An efficient alternative to sift or surf. In: 2011 International conference on computer vision. pp. 2564-2571. Ieee (2011)
38. Sarlin, P. E., DeTone, D., Malisiewicz, T., Rabinovich, A.: Superglue: Learning feature matching with graph neural networks. arXiv preprint arXiv:1911.11763 (2019)
39. Sinha, A., Unmesh, A., Huang, Q., Ramani, K.: Surfnet: Generating 3d shape teams using deep residual networks. In: Proceedings; of the IEEE conference on computer vision and pattern recognition. pp. 6040-6049 (2017)
40. Wang, K., Shen, S.: Mvdepthnet: real-time multiview depth estimation neural network. In: 2018 International Conference on 3D Vision (3DV). pp. 248-257. IEEE (2018)
41. Yao, Y., Luo, Z., Li, S., Fang, T., Quan, L.: Mvsnet: Depth inference for unstructured multi-view stereo. In: Proceedings of the European Conference on Computer Vision (ECCV). pp. 707-783 (2018)
42. Yi, K. M., Trulls, E., Lepetit, V., Fua, P.: Lift: Learned invariant feature transform. In: European Conference on Computer Vision. pp. 467-483. Springer (2016)
43. Zhang, Y., Funkhouser, T.: Deep depth completion of a single rgb-d image. In: Proceedings of the IEEE Conference on Computer Vision and Pattern Recognition. pp. 175-185 (2018)
44. Zhang Z.: Microsoft kinect sensor and its effect. IEEE multimedia 19(2), 4-10 (2012)

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed is:

1. A method for estimating depth of features in a scene from multi-view images, the method comprising:
  obtaining multi-view images, including an anchor image of the scene and a set of reference images of the scene;
  passing the anchor image and reference images through a shared RGB encoder and descriptor decoder which (1) outputs a respective descriptor field of descriptors for the anchor image and each reference image, (ii) detects sparse interest points in the anchor image in conjunction with relative poses to determine a search space in the reference images from alternate view-points, and (iii) outputs intermediate feature maps, wherein in the descriptor decoder utilizes a learning architecture configured to train descriptors;
  sampling the respective descriptors in the search space of each reference image to determine descriptors in the search space and matching the identified descriptors with descriptors for the sparse interest points in the anchor image, such matched descriptors referred to as matched keypoints;
  triangulating the matched keypoints using singular value decomposition (SVD) to output 3D points;
  passing the 3D points through a sparse depth encoder to create a sparse depth image from the 3D points and output feature maps; and
  a depth decoder generating a dense depth image based on the output feature maps for the sparse depth encoder and the intermediate feature maps from the RGB encoder.

2. The method of claim 1, wherein the shared RGB encoder and descriptor decoder comprises two encoders including an RGB image encoder and a sparse depth image encoder, and three decoders including an interest point detection encoder, a descriptor decoder, and a dense depth prediction encoder.

3. The method of claim 1, wherein the shared RGB encoder and descriptor decoder is a fully-convolutional neural network configured to operate on a full resolution of the anchor image and transaction images.

4. The method of claim 1, further comprising:
  feeding the feature maps from the RGB encoder into a first task-specific decoder head to determine weights for the detecting of the sparse interest points in the anchor image and outputting interest point descriptions.

5. The method of claim 1, wherein the descriptor decoder comprises a U-Net like architecture to fuse fine and course level image information for matching the identified descriptors with descriptors for the sparse interest points.

6. The method of claim 1, wherein the search space is constrained to a respective epipolar line in the reference images plus a fixed offset on either side of the epipolar line, and within a feasible depth sensing range along the epipolar line.

7. The method of claim 1, wherein bilinear sampling is used by the shared RGB encoder and descriptor decoder to output the respective descriptors at desired points in the descriptor field.

8. The method of claim 1, wherein the step of triangulating the matched keypoints comprises:
  estimating respective two dimensional (2D) positions of the sparse interest points by computing a softmax across spatial axes to output cross-correlation maps;
  performing a soft-argmax operation to calculate the 2D position of joints as a center of mass of corresponding cross-correlation maps;
  performing a linear algebraic triangulation from the 2D estimates; and
  using a singular value decomposition (SVD) to output 3D points.

9. A cross reality system, comprising:
  a head-mounted display device having a display system;
  a computing system in operable communication with the head-mounted display;
  a plurality of camera sensors in operable communication with the computing system;
  wherein the computing system is configured to estimate depths of features in a scene from a plurality of multi-view images captured by the camera sensors by a process comprising:

obtaining a multi-view images, including an anchor image of the scene and a set of reference images of a scene within a field of view of the camera sensors from the camera sensors;

passing the anchor image and reference images through a shared RGB encoder and descriptor decoder which (1) outputs a respective descriptor field of descriptors for the anchor image and each reference image, (ii) detects sparse interest points in the anchor image in conjunction with relative poses to determine a search space in the reference images from alternate view-points, and (iii) outputs intermediate feature maps, wherein in the descriptor decoder utilizes a learning architecture configured to train descriptors;

sampling the respective descriptors in the search space of each reference image to determine descriptors in the search space and matching the identified descriptors with descriptors for the sparse interest points in the anchor image, such matched descriptors referred to as matched keypoints;

triangulating the matched keypoints using singular value decomposition (SVD) to output 3D points;

passing the 3D points through a sparse depth encoder to create a sparse depth image from the 3D points and output feature maps; and a depth decoder generating a dense depth image based on the output feature maps for the sparse depth encoder and the intermediate feature maps from the RGB encoder.

10. The cross reality system of claim 9, wherein the shared RGB encoder and descriptor decoder comprises two encoders including an RGB image encoder and a sparse depth image encoder, and three decoders including an interest point detection encoder, a descriptor decoder, and a dense depth prediction encoder.

11. The cross reality system of claim 9, wherein the shared RGB encoder and descriptor decoder is a fully-convolutional neural network configured to operate on a full resolution of the anchor image and transaction images.

12. The cross reality system of claim 9, wherein the process for estimating depths of features in a scene from a plurality of multi-view images captured by the camera sensors further comprises:

feeding the feature maps from the RGB encoder into a first task-specific decoder head to determine weights for the detecting of the sparse interest points in the anchor image and outputting interest point descriptions.

13. The cross reality system of claim 9, wherein the descriptor decoder comprises a U-Net like architecture to fuse fine and course level image information for matching the identified descriptors with descriptors for the sparse interest points.

14. The cross reality system of claim 9, wherein the search space is constrained to a respective epipolar line in the reference images plus a fixed offset on either side of the epipolar line, and within a feasible depth sensing range along the epipolar line.

15. The cross reality system of claim 9, wherein bilinear sampling is used by the shared RGB encoder and descriptor decoder to output the respective descriptors at desired points in the descriptor field.

16. The cross reality system of claim 9, wherein the step of triangulating the matched keypoints comprises:

estimating respective two dimensional (2D) positions of the sparse interest points by computing a softmax across spatial axes to output cross-correlation maps;

performing a soft-argmax operation to calculate the 2D position of joints as a center of mass of corresponding cross-correlation maps;

performing a linear algebraic triangulation from the 2D estimates; and using a singular value decomposition (SVD) to output 3D points.

\* \* \* \* \*